(12) United States Patent
Daouphars et al.

(10) Patent No.: US 8,751,812 B2
(45) Date of Patent: Jun. 10, 2014

(54) ELECTRONIC SIGNATURE AUTHENTICATION

(75) Inventors: Raphaël Daouphars, Paris (FR); Jean-Marc Desperrier, Paris (FR); Laurent Fournié, Paris (FR)

(73) Assignee: Dictao, Paris (FR)

( * ) Notice: Subject to any disclaimer, the term of this patent is extended or adjusted under 35 U.S.C. 154(b) by 80 days.

(21) Appl. No.: 13/549,505

(22) Filed: Jul. 15, 2012

(65) Prior Publication Data

US 2013/0031370 A1 Jan. 31, 2013

(30) Foreign Application Priority Data

Jul. 15, 2011 (FR) ...................................... 11 56455

(51) Int. Cl.
*H04L 9/32* (2006.01)
(52) U.S. Cl.
CPC .................................. *H04L 9/3247* (2013.01)
USPC ........................................................ 713/176
(58) Field of Classification Search
None
See application file for complete search history.

(56) References Cited

U.S. PATENT DOCUMENTS

| | | | |
|---|---|---|---|
| 6,567,530 B1 * | 5/2003 | Keronen et al. ............... | 382/100 |
| 6,938,157 B2 * | 8/2005 | Kaplan ......................... | 713/176 |
| 7,197,644 B2 * | 3/2007 | Brewington ................... | 713/176 |
| 8,108,669 B2 * | 1/2012 | Saito et al. ..................... | 713/156 |
| 8,219,817 B2 * | 7/2012 | Filreis et al. .................. | 713/176 |
| 2001/0049789 A1 | 12/2001 | Schmid | |
| 2003/0028774 A1 * | 2/2003 | Meka ............................ | 713/176 |

FOREIGN PATENT DOCUMENTS

| | | |
|---|---|---|
| WO | 0167712 A1 | 9/2001 |
| WO | 0195071 A2 | 12/2001 |
| WO | 2005085971 A1 | 9/2005 |

OTHER PUBLICATIONS

K. Scheibelhofer, "Signing XML Documents and the Concept of What You See is What You Sign", Institute for Applied Information Processing and Communications at Graz University of Technology, 2001; 118 pgs.
French Search Report for FR 1156455, Feb. 22, 2012 (2 pgs.).

* cited by examiner

*Primary Examiner* — Minh Dinh
(74) *Attorney, Agent, or Firm* — Mike S. Ryu

(57) ABSTRACT

Method of authenticating a signature on a work document in which a remote server generates a digital work fingerprint and a representation file of the work document. The representation file and the digital work fingerprint are transmitted to a client station from the remote server via a wide area communication network, and at least one digital representation fingerprint of the representation file is generated. A file to be signed is generated containing at least the digital work and representation fingerprints. The client station generates only one client signature from the file to be signed, and a client signature file is generated containing at least the file to be signed and the client signature.

16 Claims, 5 Drawing Sheets

ELECTRONIC SIGNATURE AUTHENTICATION

FIELD OF THE INVENTION

The present invention relates to the technical field of electronic signature or digital signature used to express the consent of the signer to the content of the documents liable to formalise a contractual relation. The invention relates more particularly to the field of methods implemented so that a signer has the guarantee that the document which he displays prior to the execution of the electronic signature process corresponds to the file being effectively electronically signed. It is to guarantee that the user has a perfect knowledge of his commitments formalised by the signed file.

BACKGROUND OF THE INVENTION

This guarantee, which is necessary for the legal security of contractual and/or financial operations conducted in a purely electronic form, is expressed by the acronym WYSIWYS, or "What You See Is What You Sign".

To ensure an integrity control of the generated and displayed files, a document US 2001/049789 proposed during the creation of a work file by a server to associate to this work file an initial digital fingerprint. In addition, the server uses a display processor to generate a display file from which a second digital fingerprint is made. Then the server transmits to a client the work file as well as the two fingerprints so that, on the one hand, the client can check the integrity of the work file and, on the other hand, the client generates with a reliable display processor a display file for which it calculates the fingerprint to compare it with the second fingerprint received from the server and check the conformity of the display file. The disadvantage of such a method is that a reliable display processor is needed at the client level so that it will not be easy to change the work file format. In addition, the entire work file has to be transmitted to the client, which can pose problems if the file is very big.

A publication titled "Robust WYSIWYS: A Method for Ensuring What You See Is What You Sign" by Audun Josang and Bander AlFayyadh [(AISC2008) (CRPPIT Vol. 81 Ljiljana, Brankovic and Mirka Miller, Eds)] proposed to implement a digital camera in order to acquire a digital image from the screen on which the graphic representation of the file to be signed is displayed. The photographed digital image then undergoes a character recognition process which generates a file that is compared to the file to be signed. In case of a positive comparison, a "matching" signal is sent to the user so that he can initiate the electronic signature process. The implementation of such a digital camera renders, in practice, such a procedure unusable for the validation of a large number of transactions or for long documents which are not liable to display on only one screen. In addition, character recognition processings necessarily result in recognition errors which are liable to adversely affect the reliability of such a procedure.

In order to also respond to security needs in terms of electronic signature relating to the effectively signed file, a patent application EP 1 055 989 proposed to implement a reliable display processor integrated in a secure work hardware environment, such as a smart card or a processor and a secure memory or reliable memory different from the computer system processor and memory on which the electronic signature process is implemented. The reliable display processor generates the images of the file to be signed, which then are electronically signed. Such a system allows effectively signing images considered to be accurate of the file to be signed, but has the disadvantage of requiring a reliable display processor implemented in a reliable hardware environment at the client station. Such a system also has the disadvantage of requiring a display processor for each type of file liable to be signed. In addition, the file with effectively a signature is an image file which is not exploitable as such in automated data processing processes.

Therefore, it seems that a real need exists for a new authentic signature method for a work document which is easy to implement at the station of the work document sender as well as at the station of the user who should electronically sign this document. There exists also the need for an authentic signature method which offers to the user a guarantee that his commitment relates effectively to the elements which were displayed on his workstation before the signature process was initiated. There also exists the need for an authentic signature method which allows having the work document certified authentic and signed in a format directly exploitable by an automated data processing system. It also seems that there is a need for an authentic signature method which can be implemented with the work document's various format types in order to be able to keep pace with technical evolutions and the evolutionary needs of the work document formats according to the applications. Moreover, there exists the need to have a signature method which can be implemented from a client station without any special additional hardware device.

BRIEF SUMMARY OF THE INVENTION

In order to be able to respond to all these needs, the invention relates to an authentic signature method of a work document comprising the following steps:

generation by a remote server of a digital fingerprint of the work document, the so-called digital work fingerprint;

generation by the remote server of a representation file of the work document, the so-called representation file;

transmission by the remote server to a client station via a wide area communication network of the representation file and the digital work fingerprint;

generation of at least one digital fingerprint of the representation file, the so-called digital representation fingerprint;

generation of a file to be signed containing at least the digital work and representation fingerprints;

generation by the client station of only one signature, the so-called client signature, from the file to be signed;

generation of a client signature file containing at least the file to be signed and the client signature.

In the meaning of the invention, the work document is a file in a format adapted for an automated processing of the data contained in it. Thus, the work document can, for example, contain one or more identified fields whose values are liable to be extracted in an automated manner. Among the open formats liable to be implemented, XML may be mentioned, knowing that the work document format may be any other open format, or a proprietary format.

By making only one signature from the entire file to be signed, the method according to the invention offers the advantage of ensuring the joint signature of the work document and the representation file, while allowing to execute a separate authentication of these two elements, insofar as the file to be signed includes, on the one hand, the digital fingerprint of the work document (i.e. the digital work fingerprint) and, on the other hand, the digital fingerprint of the representation file (i.e. the representation fingerprint). Thus, the various addressees and/or users of the work document can check the authenticity of the work document so as to use it in the various automated processes without having to implement resource consuming processings, such as those required to check the authenticity of the representation file, which is by nature generally more voluminous than the work document. The representation file's authenticity may then be checked only if the work document's authenticity is in dispute, and notably for the kind of commitments that it formalises.

The invention allows therefore implementing a systematic authentication of the work document associated with an authentication on request or an exceptional authentication of the representation file. Within the scope of a process aimed at protecting the user who has appended his signature in a "WYSIWYS" context, it may then be considered that only the content of the representation file legally commits the user.

The method according to the invention offers, in addition, the advantage of making the generation of the representation file take place at the remote server so that the client station does not need to have the necessary hardware and software resources for the operation to generate the representation file. Thus, in case the work document format is changed, it is not necessary to update the client station insofar as the representation file is created in a format already readable by the client station.

In the meaning of the invention, the representation file is preferably a file intended for a presentation via a man-machine interface in a form directly intelligible to the user. What is meant by "a form directly intelligible to the user" is a form liable to be understood by the user without any help from a third-party formatting device. Among forms directly intelligible to a user, here are some:

graphic forms, such as graphic representations in an alphabetic or non-alphabetic writing system;
sound forms in a language intelligible to the user;
animated or non-animated images;
a transcription in a touch representation, such as the braille alphabet, liable to be delivered to the user by means of an adapted electromechanical device;
combinations of these various forms.

this list being neither restrictive nor exhaustive.

Thus, the representation file can be made up of data of at least one of the following categories:

images,
vector drawings,
sound,
video.

In a number of cases, for example, if a representation in the form of a vector drawing is used, the representation file may in fact represent the document very efficiently and be, in practice, more compact than the original work document. Thus, the format change may as such be sometimes advantageous and allows transmitting the representation file more efficiently than the work document could have been transmitted.

The process of generating the representation file from the work document may become a standardised process for a number of formats such that it will be sufficient to identify it so that an addressee can completely and automatically check the authenticity of the work document except in the case of a dispute.

Preferably, the representation file is a static file with a semantic stability or invariance so that its content is independent of time, data external to the representation file, and the execution environment of the presentation step. The generation step of the representation file will therefore be preferably adapted to generate a file whose content intelligible to the user is not a function of the environment in which the representation file is presented or submitted to the human user. Thus, the data of the same representation file are interpretable in exactly the same way by two different users on two different machines at two different moments.

In this spirit and in case the representation file is too bulky to be rapidly routed via the wide area communication network, according to an alternative of the invention, the representation file is adapted for a presentation or a continuous reading and contains at least one sequence liable to be part of a presentation, the contents of each sequence of the representation file being:

independent of the contents of subsequent sequences, if any;
possibly dependent on the contents of the sequence immediately preceding it;
independent of the execution environment of the presentation step.

This characteristic of the representation file offers, in addition, the advantage of allowing the user to become gradually acquainted with the document as it is transmitted to the client station without having to wait for the representation file to be entirely transmitted. This characteristic of the file also allows processing the sequences independently from one another, particularly when the client station resources are not sufficient to simultaneously process them.

The representation file can thus also be split into a series of individual elements whose transmission may be individually initiated. This particular case opens the possibility to the user to decide to approve the document's signature without necessarily having desired to be acquainted with all its elements. Depending on the legislation applicable to the signer, this case can be authorised. Thus, the application can allow the user to become familiar with the entire document before signing it, but cannot prohibit the user from signing the document even if he has not displayed it. In this particular case, the process can therefore be optimised by effectively transmitting only the parts of the representation file for which the user indicates his desires to become acquainted with; the digital fingerprint of the entire representation file will be, however, in all cases transmitted in order to be included in the signature along possibly with the indication of the parts which the user has not asked to be displayed.

According to a characteristic of the invention aimed at making sure that the user had the possibility to become acquainted with the intelligible content of the representation file, the authentic signature method of a work document includes, in addition, the following steps:

presentation on the client station and to a user of the client station of at least a part of the representation file;
initiation by the user of the signature generation step.

According to the invention, the generation steps to generate the digital representation fingerprint, the file to be signed, and the signature file can be performed on the same server or workstation or on several servers or workstations.

According to a first form of implementation of the authentic signature method of a work document in accordance with the invention, the digital fingerprint of the representation file and the file to be signed are generated by the client station.

According to a second form of implementation of the authentic signature method of a work document in accordance with the invention, the digital fingerprint of the representation file and the file to be signed are generated by the remote server and/or a third-party server and transmitted to the client station via the wide area communication network. This second form of implementation allows limiting the number of operations performed at the client station so that it is possible to limit the client station's hardware and software resources needed to accomplish the steps of the method in accordance with the invention.

According to an alternative of this second form of implementation of the authentic signature method of a work document in accordance with the invention, the method also makes the following steps take place:

generation by the client station of a digital fingerprint of the representation file, the so-called control representation fingerprint;

comparison by the client station of the representation fingerprint contained in the file to be signed with the control representation fingerprint in order to authorise in case of a match the generation of the client signature.

This alternative allows securing in a simple way the transmission phase of the representation file.

According to the invention, the signature file can be generated not only by the client station, but also by another computer system. Thus, according to an alternative of the invention, the signature file is generated by the remote server or a third-party server.

According to a characteristic of the invention aimed at increasing the security and traceability of the steps, as well as the durability of the method according to the invention, the step generating the representation file implements an identified program transforming the work document into the representation file.

It should be noted that the transformation program is deterministic. The deterministic character of the transformation program corresponds to the fact that for a given work document the representation file generated at each implementation of the transformation program is always exactly the same as the representation file generated during the first implementation of the transformation program. Thus, the representation fingerprint generated from each representation file of the same work document is exactly the same as the representation fingerprint generated from the first representation file.

According to another alternative of this characteristic of the invention aimed also at offering a traceability of the various steps and tools implemented by the method in accordance with the invention, the representation file is associated with an identifier of the transformation program.

Within the scope of this alternative, the identifier of the transformation program can be a digital fingerprint of the executable code of the transformation program.

In the same spirit and according to still another alternative of this characteristic of the invention, the file to be signed contains the identifier of the transformation program.

Insofar as all the steps of the method according to the invention are not necessarily performed on the same server or workstation, it may be interesting to implement traceability mechanisms which allow an identification of the server(s) having performed some of the process's steps.

Thus, according to another characteristic of the invention, the file to be signed contains a server signature generated by the remote server which applies to at least one of the following elements:
the work fingerprint;
the representation fingerprint;
the identifier of the transformation program.

The invention also relates to the check phase(s) of the work document previously authenticated and signed within the scope of the authentic signature method in accordance with the invention. Thus, according to a characteristic of the invention, the authentic signature method contains a check phase of the authenticity of the work document from the signature file associated with this document, which includes the following steps:

extraction of the work fingerprint from the signature file;
calculation of a new digital fingerprint from the work document;
comparison of the work fingerprint and the new digital fingerprint so that it can be concluded that the work document is authentic.

According to another characteristic of the invention, the authentic signature method contains a check phase of the authenticity of the representation file of the work document from the signature file associated with the work document:

extraction of the representation fingerprint from the signature file;
generation of a new representation file from the work document;
calculation of a new digital fingerprint from the new representation file;
comparison of the representation fingerprint and the new digital fingerprint so that it can be concluded that the representation file of the work document is authentic.

According to still another characteristic of the invention, the authentic signature method contains a phase to perform the complete authenticity check, which consists of the check phase of the work document and the check phase of the representation file.

When a signature step has been implemented by a remote server, the method according to the invention may include a check of the signature server.

Of course, the various characteristics, alternatives and forms of implementation of the authentic signature method of a work document according to the invention can be associated with one another according to various combinations insofar as they are not incompatible or mutually exclusive.

BRIEF DESCRIPTION OF THE DRAWINGS

Moreover, various other characteristics of the invention emerge from the description below and the drawings in reference which show the non-restrictive forms of implementation of the authentic signature method of a work document according to the invention.

It should be noted that on these figures the steps common to the various forms or alternatives have the same references.

DETAILED DESCRIPTION OF THE INVENTION

Figure 1:
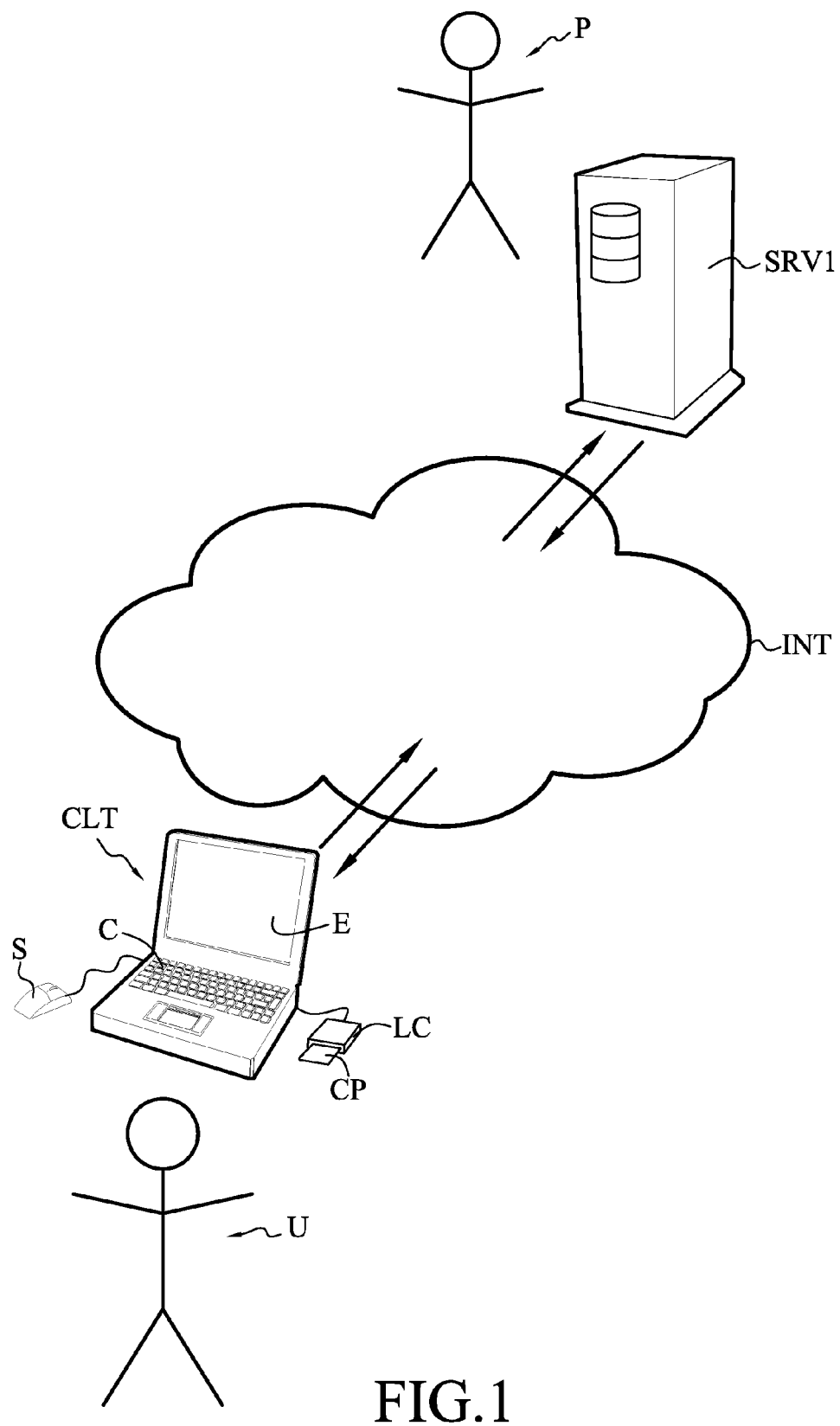
FIG. 1 shows schematically a possible implementation context of the invention.

The authentic signature method according to the invention is liable to be implemented within the framework, for example, but not exclusively, of the acquisition of goods or the subscription to services by a user U with a service provider P within the framework of a completely dematerialised process. For this purpose and as shown in FIG. 1, the service provider P has a remote server SRV1 connected to a wide area communication network INT, such as INTERNET. The user U has a client station CLT comprising, for example, a personal computer with a man-machine interface. According to the illustrated example, the man-machine interface consists of a touch screen or ordinary monitor associated with a keyboard C, as well as a pointing device S, such as a mouse. In this case, the client station CLT has a smart card reader LC and the user U has a smart card CP. The client station CLT is also connected to the wide area communication network INT.

Within the framework of an interactive process between the user U and the remote server SVR1 via the client station CLT, the user U determines the characteristics of a transaction which he desires to make with the service provider P. These characteristics are incorporated at the remote server SRV1 in the form of a work document DOC which is adapted for an automated processing, allowing the service provider P to perform the various operations of the transaction. The work document can contain, for example, various items of information, such as the user's name, address, and phone/fax numbers, the kind of service comprising the transaction, this service's price, this service's execution and guarantee conditions, the payment mode with the bank name, address and identifier(s) of the user U. The work document DOC is created in a format which allows a computerised extraction of the information which it contains. As an example, the work document can be created in the XML language. Such a language is particularly adapted for automated processings, but has the disadvantage of not being directly intelligible for a novice. Thus, the reading of the work document in its raw form does not allow the user U to have a knowledge of the complete nature of the transaction associated with the work document.

In order for the user to have a knowledge of the nature of the transaction associated with the work document DOC, it is necessary to generate a presentation of the work document DOC in a form directly intelligible to the user. It is from this directly intelligible form that the user may decide to validate the transaction within the scope of a process for appending an electronic signature by means of, for example, a smart card CP. Of course, within the framework of the invention, the smart card is not the only means for appending a signature liable to be implemented; all other appropriate signature means may be implemented, whether of a hardware or software nature.

The invention proposes, in particular, securing the presentation of the work document DOC in its directly intelligible form so that the user U has the guarantee that what he signs corresponds to what has been presented to him. In the case of a visual presentation, the user must have the guarantee that what he sees corresponds to what he signs, a principle summarised by the acronym WYSIWYS.

The invention also proposes securing or authenticating the work document in itself in order to secure the operations liable to be performed by the service provider P or third parties from the work document DOC.

Figure 2:
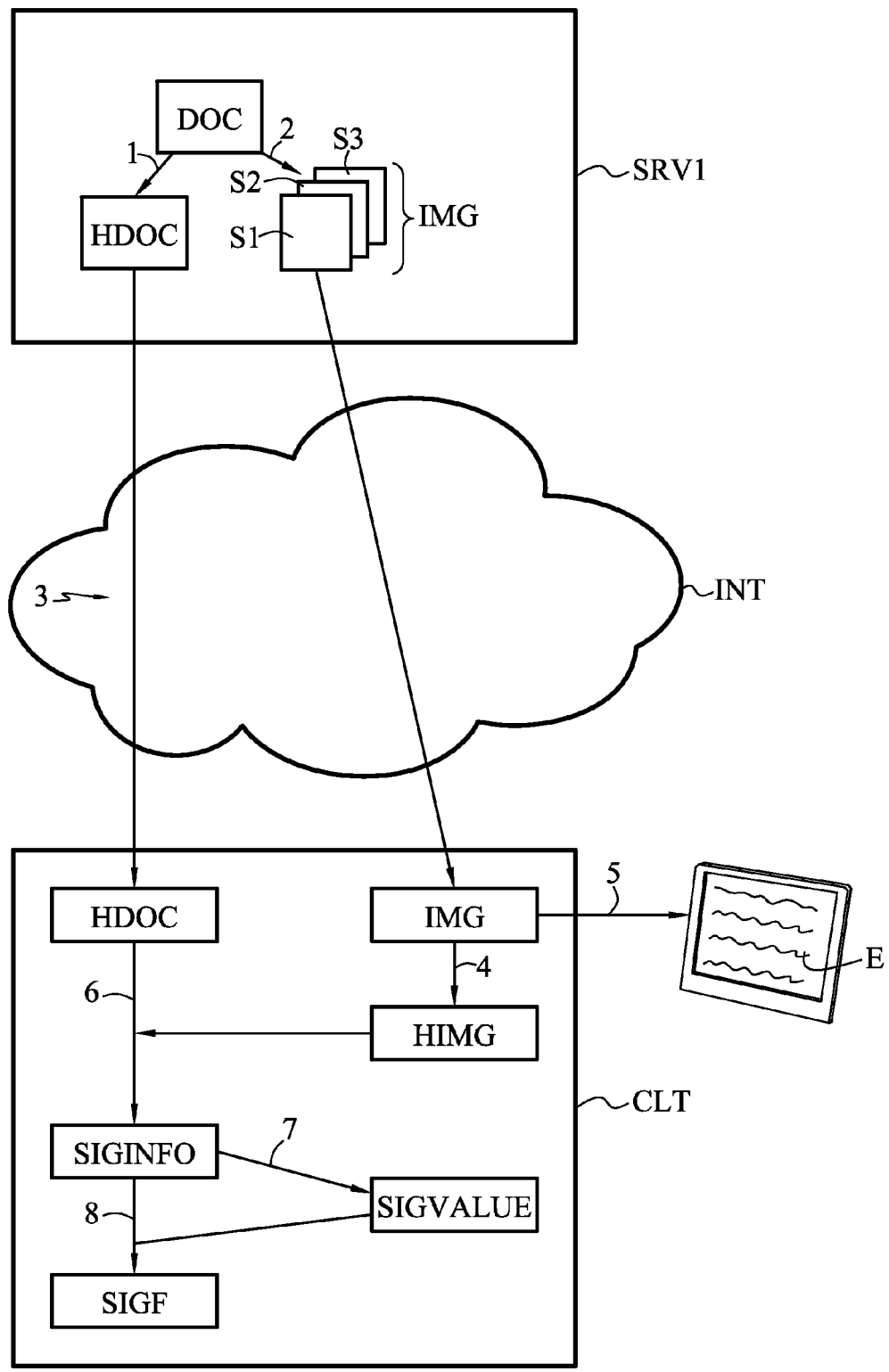
FIG. 2 shows schematically the various steps of a first form of implementation of the signature method using a detached format between a remote server and a client station.

Thus, in a form of implementation of the method according to the invention whose various steps are shown in FIG. 2, the remote server SRV1 generates in step 1 a digital fingerprint of the work document DOC, the so-called digital work fingerprint HDOC.

As a general rule and as known by the person skilled in the art, the generation of a digital fingerprint of a file or a digital document includes a hashing operation which consists of applying a one-way compression function on the file or digital document. Among the one-way compression functions, still called hashing functions, liable to be used, it is possible to mention WHIRLPOOL, SHA-1, SHA-2, or RIPE-MD-160, this list being neither restrictive nor exhaustive.

Within the framework of the invention, the generation of the work fingerprint HDOC can make take place before the hashing operation a canonical format operation of the work document HDOC, notably when the latter is created in the XML format.

After execution of step 1, the remote server SRV1 has the work document DOC and the work fingerprint HDOC.

In step 2, the remote server SRV1 generates a representation file IMG of the work file DOC. The representation file IMG is intended to allow a presentation on the client station CLT of the work document DOC and/or the transaction corresponding to the work document in a form intelligible to the user. In order to allow a presentation ergonomy compatible with the throughputs authorised by the wide area communication network INT, the representation file will be preferably adapted for a continuous presentation or a continuous reading. Then the representation file contains at least one sequence liable to be covered autonomously by a presentation. Should the size of the representation file impose using several sequences, the content of each sequence will be independent of the content of any sequences following it, while being possibly dependent on the content of the sequence immediately preceding it, if the format of the representation file is, for example, a format making interact a compression by difference.

According to the illustrated example, the representation file IMG contains images of a typed contractual document corresponding to the transaction defined by the work document. The representation file IMG consists here of three sequences S1, S2, S3, which are three BITMAP formatted files of three pages of the typed contractual document. Within the scope of a static graphic representation, the BITMAP format was chosen because of its universal character. However, various other formats may be used.

Step 2 of the generation of the representation file IMG makes preferably interact an identified transformation program, which will have a deterministic character. The identifier of the transformation program can be, for example, a digital fingerprint of the executable code of the transformation program. This identifier may then be used within the scope of the method according to the invention as will be shown hereafter.

After execution of steps 1 and 2, the remote server SRV1 has the work document DOC, the work fingerprint HDOC and the representation file IMG. It should be noted that steps 1 and 2 may be executed equally in any order and that they may also be simultaneously executed. In addition, it should be noted that the work document DOC is not necessarily created by the server which performs steps 1 and 2, but DOC may have been transmitted to this server by another server.

According to the illustrated example, the remote server SRV1 transmits in a step 3 to the client station CLT via the wide area communication network INT the work fingerprint HDOC and the representation file IMG.

In a step 4, the client station generates a digital fingerprint of the representation file IMG, the so-called digital representation fingerprint HIMG. In a step 5, the workstation proceeds with the presentation to the user U of at least a part of the representation file IMG. In the case of the illustrated example, the client station displays on the screen E each of the sequences S1 to S3 for which the user can control the scrolling by means of the keyboard C and/or the mouse S. Steps 4 and 5 may be executed equally in any order. However, to facilitate the handling of particularly bulky representation files, step 5 may be selected first to make a presentation in order to allow loading the entire representation file before generating (step 4) the digital representation fingerprint HIMG.

In the meaning of the invention, when the representation file IMG has several sequences, the digital representation fingerprint HIMG can be made up of:
- either only one value, which is the result of the application of the hashing function to all the sequences and therefore to the representation file;
- or a series of values which contain as many values as sequences and for which each value is the result of the application of the hashing function to a sequence.

When the client station CLT has generated the representation fingerprint HIMG, it can in a step 6 generate a file to be signed SIGINFO containing at least the digital work fingerprint HDOC and the representation fingerprint HIMG. The file to be signed SIGINFO can also contain the identifier of the transformation program which was transmitted by the remote server SRV1 to the client station CLT.

After displaying the representation file IMG, the user U can initiate a step 7 to have generated by the client station CLT a signature, the so-called client signature SIGVALUE, by means of a smart card within the framework of a public key infrastructure.

As a general rule and as known by the skilled in the art, the generation of a signature within the framework of a public key infrastructure makes intervene the generation of a digital fingerprint HSIGINFO of the file to be signed SIGINFO followed by an encryption of this digital fingerprint by an asymmetrical public-key algorithm by means of the user's private key. Among the asymmetrical encryption algorithms liable to be implemented, it is possible to mention RSA, DSA, or ECC, this list being neither restrictive nor exhaustive.

After the client signature SIGVALUE is generated, the client station generates in a step 8 a client signature file SIGF which contains at least the file to be signed SIGINFO and the client signature SIGVALUE.

This client signature file SIGF can then be attached or logically linked (i.e. digitally associated) to the work document DOC.

Figure 3:
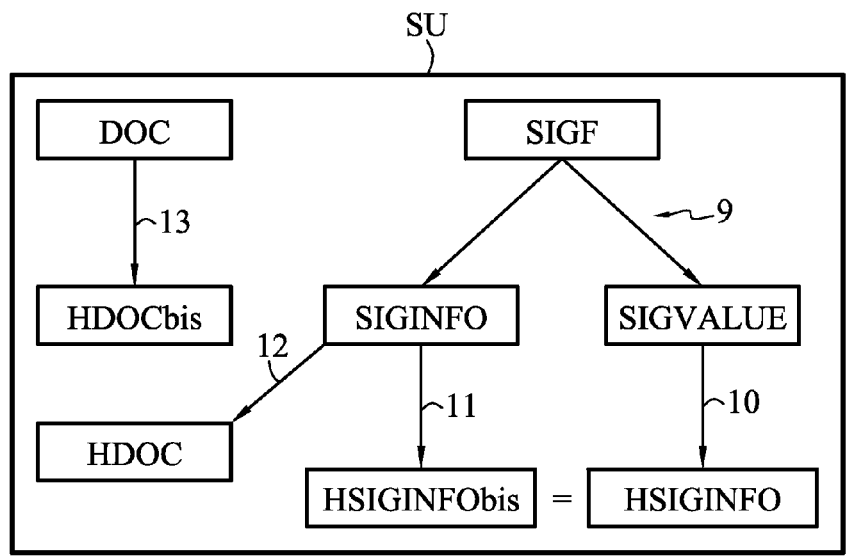
FIG. 3 shows schematically the various steps of a check phase of the authenticity of the work document from an authentic signature generated by the implementation of the method according to the invention.

When a user system SU desires to implement the work document DOC, while making sure of its authenticity, it implements more particularly a check phase shown in FIG. 3. This check phase has a step 9 during which the file to be signed SIGINFO and the client signature SIGVALUE are extracted from the signature file SIGF. In a step 10, the client signature is decrypted by means of the user's public key in order to obtain the digital fingerprint of the file to be signed HSIGINFO. In a step 11, a new digital fingerprint HSIGINFObis of the file to be signed SIGINFO is calculated by means of the same hashing function as that used in step 7 for the generation of the client signature. This new fingerprint is compared to the HSIGINFO fingerprint so that it can be concluded that the file to be signed SIGINFO is authentic.

In a step 12, the digital work fingerprint HDOC is extracted from the file to be signed SIGINFO. In a step 13, a new digital fingerprint HDOCbis is generated from the work document DOC according to the same algorithm as that implemented in step 6. In case of a match between the new digital fingerprint HDOCbis and the digital work fingerprint HDOC, it can be concluded that the work document DOC is authentic and can then be implemented by the user system SU.

Figure 4:
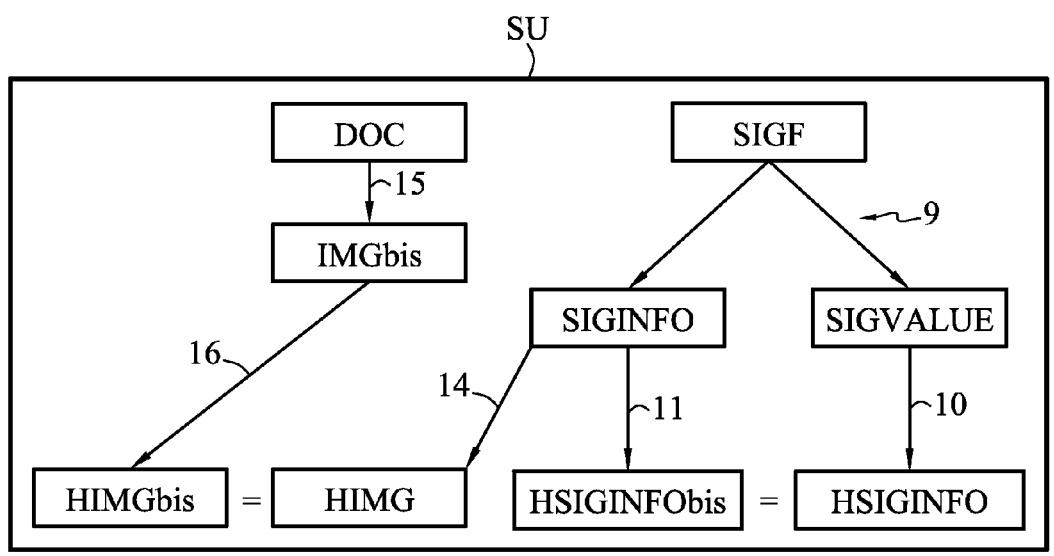
FIG. 4 shows schematically the various steps of a check phase of the authenticity of the representation file from an authentic signature generated by the implementation of the method according to the invention.

When the user system SU desires to check the commitment effectively taken by the user U based on the representation file, the user system SU implements a check phase of the authenticity of the representation file of the work document from the signature file SIGF associated with the work document DOC as shown in FIG. 4.

First, the user system SU checks the authenticity of the file to be signed SIGINFO by implementing the aforementioned steps 9 to 11 and, if the file to be signed SIGINFO is authentic, the user system SU extracts in a step 14 the digital representation fingerprint HIMG from the file to be signed SIGINFO.

Then, in a step 15, the user system SU generates a new representation file IMGbis by implementing the same transformation program as that used in step 2. From this new representation file IMGbis, the user system generates in a step 16 a new digital fingerprint HIMGbis by implementing the same algorithm as that used in step 4. In case of a match between the new digital fingerprint HIMGbis and the digital representation fingerprint HIMG, the presence of the identifier of the transformation program in the file to be signed can be taken advantage of to check the implementation of the same transformation program in step 2 and in step 16.

The user system can also proceed with a complete check, which will consist of performing the check phase of the work document DOC and the check phase of the representation file IMG.

Figure 5:
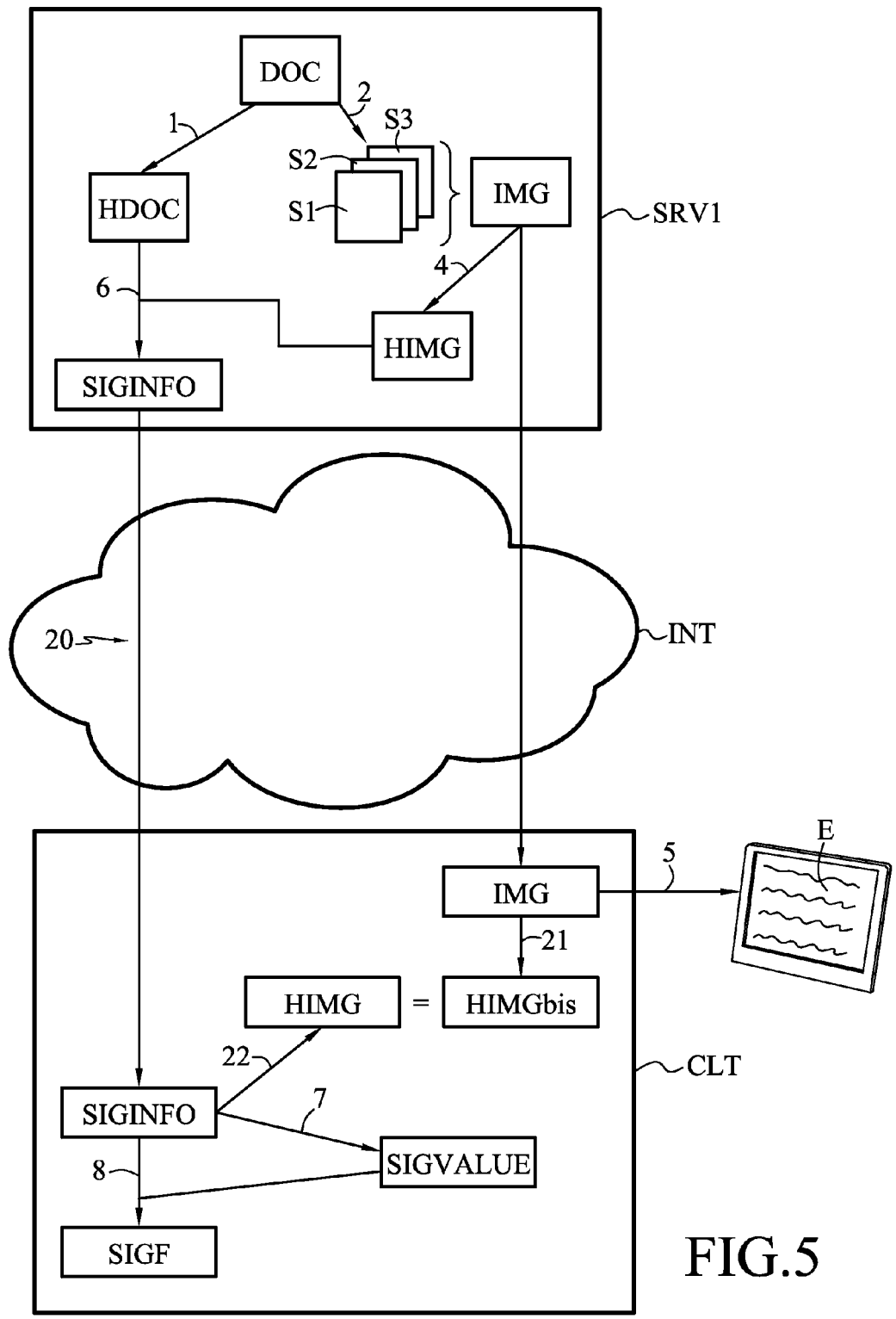
FIG. 5 shows schematically the various steps of a second form of implementation of the signature method between a remote server and a client station.

According to the invention, the authentic signature method of the work document is not necessarily implemented such as previously described in relation with FIG. 2. Thus, FIG. 5 describes a second form of implementation according to which in step 4, the generation of the digital representation fingerprint HIMG, and in step 6, the generation of the file to be signed SIGINFO, are performed by the remote server SRV1.

According to this second form of implementation, the remote server SRV1 transmits to the client station CLT in a step 20 the file to be signed SIGINFO and the representation file IMG.

Moreover, the client station CLT proceeds in a step 21 with the generation of a new digital fingerprint HIMGbis, the so-called control representation fingerprint, of the representation file IMG by implementing the same algorithm as that used in step 4. In a step 22, the client station extracts from the file to be signed SIGINFO the digital representation fingerprint HIMG in order to compare it to the control representation fingerprint HIMGbis. In case of a match between the digital fingerprints HIMGbis and HIMG, the authentic signature method continues with the implementation of step 7 to generate the client signature and SIGVALUE and of step 8 to generate the signature file SIGF. However, in case of a mismatch, the authentic signature method is interrupted.

Figure 6:
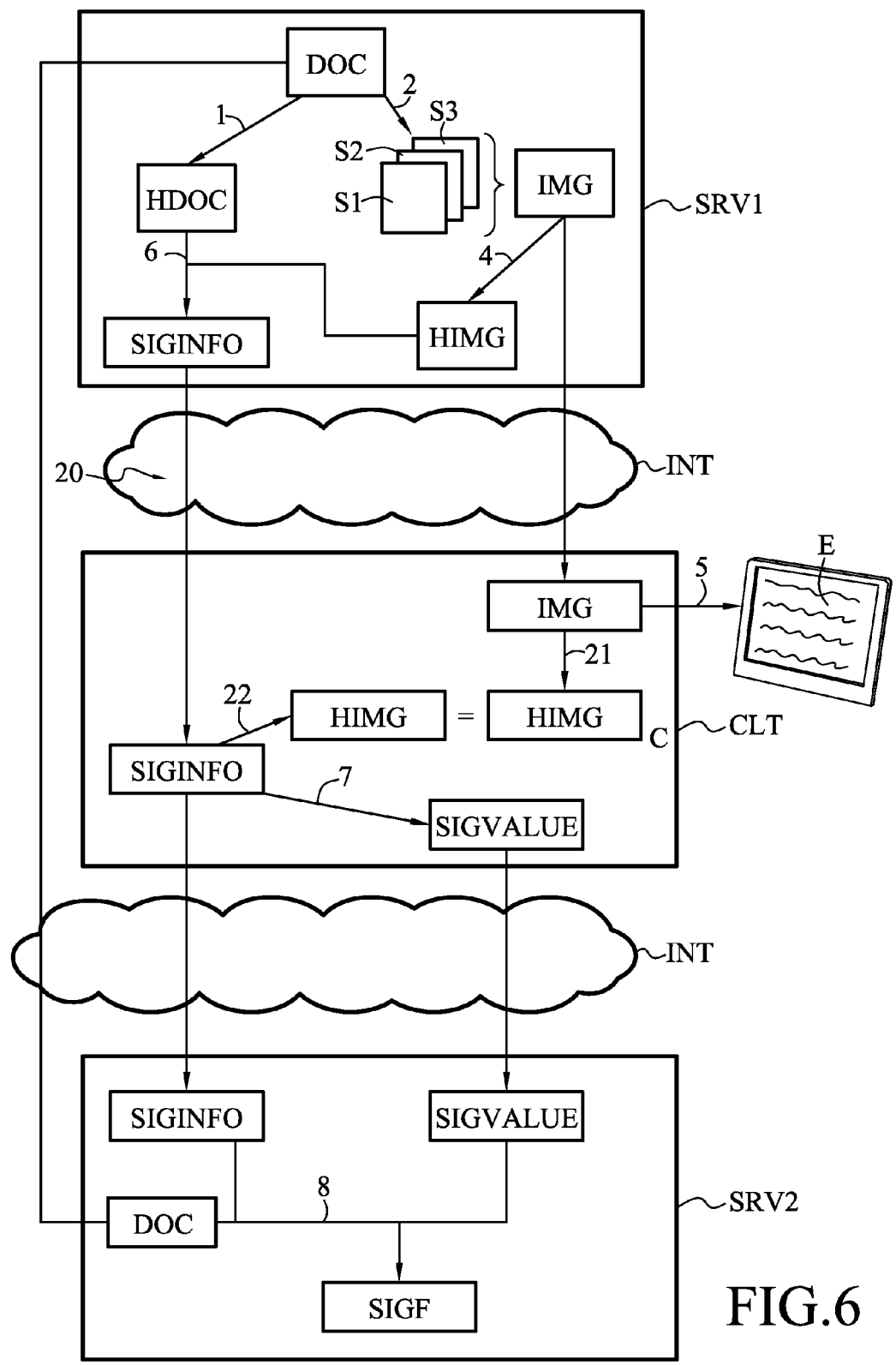
FIG. 6 shows schematically the various steps of an alternative second form of implementation of the signature method between a remote server and a client station with the interaction of a second remote server for the formation of the signature file.

FIG. 6 shows an alternative of the second form of implementation of the method according to which in step 8 the generation of the signature file SIGF is executed by a second remote server SRV2. According to this alternative, the signature file SIGF contains the file to be signed SIGINFO, the client signature SIGVALUE and the work document DOC.

A possible implementation of the invention can be shown based on the CMS format ("Cryptographic Message Syntax") such as described by RFC 5652. The CMS-formatted signature process in the case where the signed attributes are present is as follows:
- a fingerprint of the work document is calculated and placed in an attribute element called "message-digest" which belongs to the generic Attribute type. This attribute is described in subsection 11.2 for each signer of the document the format, offering the possibility of having several of them, a Signerinfo structure such as described in subsection 5.3 of the RFC is formed this Signerinfo structure has a SignedAttrs element, which is a list of elements of the individual Attribute types. All the signed attributes to be included in the document's signature must be placed in the SignedAttrs element. The list of attributes must necessarily have one and only one "message-digest" element to make the link with the signed document (such as indicated repeatedly in subsections 11.2, 5.3 and 5.4).

subsection 5.4 describes that as soon as the SignedAttrs element is present (it is optional if no signed attribute is included in the signature), the "message digest" value is calculated by making a fingerprint of this SignedAttrs value subsection 5.5 specifies that this "message digest" value is that used at the input of the electronic signature algorithm selected to calculate the value of the document's signature In the implementation of the invention, a new attribute is defined by using the possibility indicated in subsection 11 to define additional attributes. A unique identifier is defined for this attribute so that the applications which recognise this identifier know how to interpret the content. The attribute's format is defined to include at least a list of the elements of the representation file, including each time the fingerprint of each element. Thus, the signature calculated conventionally according to the process of subsection 5.5 is appended not only on the original document as usual for the CMS format and immediately interpretable by any application, but also simultaneously thanks to this new attribute on the representation file which was presented to the user and which may therefore be used in case of doubt or ambiguity to eliminate any dispute. The fact that only one signature operation is performed on the two elements prevents any doubts from persisting in case two separate operations would be performed, one on the document and the other on the representation file, and eliminates the risk that the signature appended on the document would later on be associated with a signature on a representation different from the original.

In the invention, in all cases, the attribute element called "message-digest" of subsection 11.2 is calculated on the server. The operation of the subsection 5.5 is initiated by the local application using a signature means under its exclusive control. The SignedAttrs element may be built as preferred: either by the local application, by integrating the calculation of the fingerprint of the elements of the representation file received from the server, or by the server, the local application having the responsibility of accepting the SignedAttrs element only if it can confirm that the fingerprint values which the SignedAttrs element contains conform to those that it calculated itself on the elements of the representation file that it received from the server.

The format of the attribute newly defined by the invention can be extended to include additional elements, which allow performing other functions of the invention. Thus, it may contain an identifier of the process used to create the representation file of the document in order to avoid any ambiguity on it by, for example, a fingerprint of the libraries used to install the process. It may also contain, if considered relevant, a flag element indicating for each part of the representation file whether the user asked the application to display it or decided to approve it without asking to display it.

The application of the principle described here extends easily to any signature format comprising signed attributes for which there are extension possibilities, such as also the XAdES format defined by the document ETSI TS 101 903, and the "Signature properties" elements which it contains.

Moreover, to ensure a traceability of the computer systems implemented all along the process, it can be envisioned to have intervene for each intervention of a server a signature by this server of the file to be signed, the so-called server traceability signature. This signature can be made within the framework of a counter-signature chain, which will consist of signing at each step the previous server traceability signature. The server traceability signature may be checked by each server or client station interacting in the process.

It can also be envisioned to implement an identity check of the server issuing the files and documents by incorporating a signature issued by this server, the so-called server signature, in the file to be signed. This server signature, for example, may be substituted for at each step so that the file to be signed contains only the signature of the last server having performed a processing. It can also be envisioned to save in the file to be signed the server signature of each server which interacted in the process. The server signature may be checked by each server or client station interacting in the process.

Of course, various other alternatives to the authentic signature process according to the invention can be envisioned within the framework of the attached claims.

The invention claimed is:

1. Method of authenticating a signature on a work document, comprising:
    a remote server generating a digital work fingerprint of the work document;
    the remote server generating a representation file of the work document;
    transmitting the representation file and the digital work fingerprint to a client station from the remote server via a wide area communication network;
    generating at least one digital representation fingerprint of the representation file;
    generating a file to be signed containing at least the digital work fingerprint and the digital representation fingerprint;
    the client station generating only one client signature from the file to be signed; and
    generating a client signature file containing at least the file to be signed and the client signature.

2. Method according to claim 1, further comprising:
    presenting at least part of the representation file at the client station; and
    initiating the signature generation step by a user.

3. Method according to claim 1, wherein the digital fingerprint of the representation file and the file to be signed are generated by the client station.

4. Method according to claim 1, wherein the digital fingerprint of the representation file and the file to be signed are generated by the remote server and/or a third-party server and transmitted to the client station via the wide area communication network.

5. Method according to claim 4, further comprising:
    the client station generating a digital control representation fingerprint of the representation file; and
    the client station comparing the representation fingerprint contained in the file to be signed with the control presentation fingerprint in order to authorize, in case of a match, generating the client signature.

6. Method according to claim 1, wherein the signature file is generated by the remote server or a third-party server.

7. Method according to claim 1, wherein the representation file is a file intended for a presentation via a man-machine interface in a form directly intelligible to the user.

8. Method according to claim 1, wherein the representation file is adapted for a continuous presentation or a continuous reading and contains at least one sequence liable to be covered by a presentation, the content of each at least one sequence of the representation file being:
- independent of the content of subsequent sequences, if any; and
- independent of the execution environment of the presentation step.

9. Method according to claim 1, wherein generating the representation file comprises implementing an identified program transforming the work document into the representation file.

10. Method according to claim 9, wherein the representation file is associated with an identifier of the transformation program.

11. Method according to claim 9, wherein the file to be signed includes the identifier of the transformation program.

12. Method according to claim 1, wherein the file to be signed contains a server signature generated by the remote server and applied to at least one of:
- the work fingerprint;
- the representation fingerprint; and
- the identifier of the transformation program.

13. Method according to claim 12, further comprising checking the server signature.

14. Method according to claim 1, further comprising checking the authenticity of the work document from the signature file associated with the work document, the checking step comprising:
- extracting the work fingerprint from the signature file;
- calculating a new digital fingerprint from the work document; and
- comparing the work fingerprint and the new digital fingerprint to determine if the work document is authentic.

15. Method according to claim 1, further comprising checking the authenticity of the representation file of the work document from the signature file associated with the work document, the checking step comprising:
- extracting the representation fingerprint from the signature file;
- generating a new representation file from the work document;
- calculating a new digital fingerprint from the new representation file; and
- comparing the representation fingerprint and the new digital fingerprint to determine if the representation file of the work document is authentic.

16. Method according to claim 8, wherein the content of each at least one sequence of the representation file is dependent on the content of the sequence immediately preceding it.

* * * * *